Patented Dec. 1, 1953

2,661,297

UNITED STATES PATENT OFFICE 2,661,297

METHOD OF SOIL STABILIZATION

Conrad Lawrence Walsh, William Bernard Hawes, and Frank Foulger, Bulstrode, Gerrards Cross, England, assignors to A. S. P. Chemical Company Limited, Bulstrode, Gerrards Cross, England, a British company No Drawing. Application May 27, 1949, Serial No. 95,884

7 Claims. (Cl. 106—15)

This invention relates to an improved method of soil stabilisation and has more particular reference to the upgrading of such in the preparation of foundations and the like wherein the maximum resistance to load is imparted to the soil factors by obtaining and maintaining optimum conditions.

It is well known that each type of soil has a maximum mechanical strength under certain physical conditions which depends mainly on its particle size grading and its moisture content, thus, for example, clay under some conditions can possess a great bearing strength whilst under other conditions it is either a mud or dust.

The object of this invention is to stabilise a soil of given particle size grading at or above this condition of maximum strength, which occurs at a moisture or water content which has a specific optimum value for each soil.

The condition of maximum strength can be achieved by mixing with the soil sufficient moisture to bring it to its optimum moisture content, or if the soil is already too wet by drying it down to this condition. The soil is, however, not physically stable under these conditions as it may lose strength by gaining or losing water.

We have ascertained that each type of soil can be stabilised at its maximum mechanical strength by maintaining definite water content by the addition of certain vegetable materials with the further addition of di- or tri-valent metal salts such as of calcium, aluminium, magnesium and iron. These metal salts form insoluble complexes with pectates and proteins, which latter are normally present in the vegetable matter and such complexes have ion exchange and polar and gel forming properties.

The invention consists in breaking down the soil to a suitable particle size for admixture allowing same to dehydrate partly if necessary, or adding water thereto until the moisture content has reached the empirical optimum percentage and reinforcing the prepared soil with vegetable matter in a ripened or semi-ripened condition more particularly by the addition to the said soil of the suitably prepared shells or husks from nuts, berries or beans, such as ground nuts (arachis), cocoanut shells, cashew waste, cocoa and coffee waste and similar vegetable matter with or without added green stalks or twigs of a fascine character that contain their natural wax, tannins and other chemical compounds arising from natural growth and finally compacting the whole. Before or after this addition and incorporation the water content is adjusted until the empirical optimum conditions are obtained.

We have further found, for the purposes of this invention, that the important constituents of the vegetable matter are pectates, proteins, waxes, oils and resins. We have also ascertained that each of these definite chemical bodies will assist in stabilising the soil independently to a greater or lesser degree, according to the nature of the soil treated, and the chemical or physical inherent qualities of the added vegetable matter, but when the above chemical bodies are present in the vegetation the result from each appears additive and this additive upgrading is definite even in the presence of large quantities of cellulosic and lignin material. In many cases the presence of cellulosic material is beneficial and especially so when added to soils wholly or in part deficient thereof in conjunction with di- or tri-valent metal salts and recently harvested vegetable matter.

It may be stated as a proved fact that in general the stabilisation of any soil is the more effective the lower the content of water soluble or water absorbing material. Thus pectous and mucilaginous substances are disadvantageous since they tend to absorb water or become solutes. If water be absorbed they swell, and increase the volume of the soil and are deleterious. Hence alginates and sea weeds are useless, as they swell in the voids to an extent which seprate the soil particles and destroy the stabilising effect. However a small proportion of say about 3% of metal pectate or protein gel which absorbs little water and does not swell much is an advantage.

In preparation for soil stabilisation the particle size grading is taken as existing and the soil is broken down to a particle size which should be as well divided as possible so as to allow the added ingredients access to the surfaces of each soil particle irrespective of its size. The added solid ingredients should be finely ground in order to release the active components in a reasonable time.

The invention consists in an improved method of soil stabilisation comprising the reduction of the soil to a desirable particle size with suitable adjustment of the water content and then adding thereto in comminuted form vegetable matter carrying a proportion of pectates, proteins, waxes and/or oils and resin also in comminuted form and with or without a binding agent, and of then adjusting the water content in situ or otherwise to obtain the predetermined optimum conditions and compressing same to reduce voids.

The addition of a small proportion of cellulosic matter in the form of peat if not naturally occurring may be added to the soil prior to or during the addition of the vegetable matter.

Portland, ferric or aluminous cement in proportions considerably less than would be used for what is known as "soil concrete" can replace or partly replace the above mentioned metal salts in certain soils with advantage to bearing strength, and it is advantageous to grind the metal salt and/or cement clinker together with the vegetable matter in order to obtain a fine intimate mix.

The process of soil stabilisation according to the invention may be carried into effect in situ by the aid of a relatively small portable plant or road making machines, or alternatively the soil may be subjected to partial drying or wetting, granulation, and admixture with the stabilising ingredients, and precast and compressed into moulds and utilized as building blocks or as bricks. The stabilizers will act efficiently with acid, neutral or basic soils, which is not the case where resins constitute the main or sole stabilising factor, since any soil alkalinity tends to destroy the polar effect by forming resinous emulsions or kindred water soluble compounds. The pH value of the stabilizer is preferably however less than 7 for any soil and if necessary the pH may be decreased by treatment with a weak acid solution, or by using vegetation of an acidic nature such as grape skins (tartaric) or wood sorrel (oxalic).

With some soils it has been found desirable to employ a binding agent and with such soils a binding agent other than cement is used such as tar, pitch, wax or bitumen, which latter material or materials is or are added to the soil after comminution in a pulverised or emulsified state in the cold.

The vegetable matter preferred is an admixture of mature or ripened material and a proportion of unripened material. Thus stripped sisal flesh either as sundried decorticated matter or brush room dust may with advantage be employed since it carries a high proportion of pectic material and is rich in protein with some wax. This material in a ground condition, may be admixed for example with groundnut (arachis) shells, or the ground husks or shells of other nuts, cocoanut shell, cashew waste and cocoa and coffee bean waste. To such ripened material may be added the dried and ground green stocks or twigs of a fascine character such as willow which latter when embedded have inherent non-putrifying characteristics.

The vegetable soil stabilising ingredients are preferably applied to the soil as a fine powder or as an aqueous suspension for ion exchange with the anions or cations of the soil, the admixed metal salt or salts then being very rapid in action.

In tropical climates or when dealing with soils that are rich with humus, or have had a humus cover it has been found beneficial to employ a small percentage of a sterilising medium which may be a copper or other metal salt or preferably sodium pentachlorophenate as a germicide or the like. The addition of germicides and insecticides is generally advantageous in all cases.

In the following examples a control sample of the particular soil was made as a criterion.

*Example 1.—"Control" (unstabilised)*

A sample of brickearth soil was prepared by passing through a screen of $\frac{1}{16}''$ mesh and shaped into a cylinder 3" long and 2" diameter, with a cubic capacity of 154.4 ccs. It was previously ascertained that the soil had an optimum dry density of 118 lbs./cu. ft. when the moisture content was 15.3% so that by reducing the water content to 12% a voidage of 10% and a dry density of 112 lbs./cu. ft. was attained. Thus the cylinder of compacted soil contained 15.44 ccs. of air.

The cylinder was then placed in water to a depth of ½" and capillarity allowed to take place.

The specimen absorbed 28 gms. of water in one day and collapsed.

*Example 2*

A specimen of brickearth was prepared as in Example 1 and then to it was added 5% of a mixture of sisal flesh and sisal residual in equal parts, with 0.75% of aluminium sulphate. It was compressed into a cylinder as in Example 1 designed to have a 10% voidage or 15.4 ccs. of air. Its pick-up in gms. over a period of continuous immersion in water to a depth of ½" was as follows:

| 1 day | 2 days | 3 days | 7 days | 14 days |
|---|---|---|---|---|
| 4.7 | 6.7 | 7.2 | 8.7 | 10.7 |

*Example 3*

A specimen of brickearth was prepared as in Example 1 and then to it was added 5% of the husk of the groundnut which had been broken down in a hammer mill. To this was added 0.75% aluminium sulphate. It was then compressed into a cylinder as in Example 1 designed to have a 10% voidage or 15.4 ccs. of air. Its pick-up in gms. after a period of continuous immersion to a depth of ½" of water was as follows:

| 1 day | 2 days | 3 days | 7 days | 14 days | 21 days | 28 days |
|---|---|---|---|---|---|---|
| 2.2 | 2.9 | 3.4 | 6.5 | 9.5 | 10.0 | 11.5 |

This specimen contained 0.5% of the stabiliser of sodium pentachlorophenate as a germicide.

*Example 4*

Two specimens were prepared with brickearth to which was added 3% of groundnut husk suitably ground and 5% Portland cement, and 1.5% of sodium pentachlorophenate. They were compressed into cylinders as in Example 1 designed to have a voidage of 10% or 15.4 ccs. of air. One was tested for water absorption and its pick-up in gms. after a period of continuous immersion in water to a depth of ½" was as follows:

| 1 day | 2 days | 3 days |
|---|---|---|
| 2.0 | 2.5 | 2.5 |

After three days the cylinder was completely immersed in water for seven days when it picked up 12.0 gms. or 4% of its dry weight.

The sample was tested for compressive strength and it broke at 300 lbs./sq. in. A similar untreated specimen broke at 12 lbs./sq. in.

*Example 5*

A specimen of brickearth was prepared as in Example 1 and to it was added 3% of a mixture of groundnut husk, suitably broken down and ground peat, in equal parts, together with 0.75% aluminium sulphate. This was then compressed into a cylinder as in Example 1 designed to have a voidage of 10% or 15.4 ccs. of air. Its pick-up in grams after a period of continuous immersion in water to a depth of ½" was as follows:

| 1 day | 2 days | 3 days | 7 days | 14 days |
|---|---|---|---|---|
| 2.5 | 3.7 | 4.3 | 5.5 | 7.0 |

*Example 6*

A specimen of laterite from Tanganyika was prepared as in Example 1 and to it was added 3% of groundnut husks suitable broken down and 2% of cement with 0.75% of aluminium sulphate. This was then compressed into a cylinder as in Example 1 designed to have a voidage of 10% or 15.4 ccs. of air. Its pick-up in grams after a period of continuous immersion in water to a depth of ½" was as follows:

| 1 day | 2 days | 3 days | 5 days |
|---|---|---|---|
| 1.8 | 3.0 | 3.4 | 4.5 |

*Example 7*

A tablet was prepared as in Example 6 but only ½" thick and 2" dia. After complete immersion in water for seven days its weight increased from 40.855 to 41.9 gms. or by only 2.75%.

*Example 8.—"Control" (unstabilised)*

A specimen of chalk was prepared as in Example 1 (having previously ascertained that it had an optimum dry density of 107 lbs./sq. ft. with a moisture content of 19.5% of the dry weight) and then compressed into a cylinder as in Example 1, designed to have a voidage of 10% or 15.4 ccs. of air. The cylinder was then placed in water to a depth of ½" and in six hours had absorbed 18 gms. of water and collapsed.

*Example 9*

A specimen of chalk was prepared as in Example 8 and then to it was added 3% of groundnut husk, suitably broken down, with 2% cement and 0.75% of aluminium sulphate. It was then compressed into a cylinder as in Example 1 designed to have a voidage of 10% or 15.4 ccs. of air. Its pick-up in gms. over a period of continuous immersion in water to a depth of ½" was as follows:

| 1 day | 2 days | 3 days | 4 days | 7 days |
|---|---|---|---|---|
| 1.5 | 1.5 | 1.5 | 1.5 | 2.5 |

*Example 10.—"Control" (unstabilised)*

A specimen of clay was prepared as in Example 1 (having previously ascertained that it had an optimum dry density of 115 lbs./cu. ft. at a moisture content of 12.75%) and then compressed into a cylinder as in Example 1, designed to have a voidage of 10% or 15.4 ccs. of air. The cylinder was then placed in water to a depth of ½" and in 24 hours had collapsed, absorbing 21 gms.

*Example 11*

A specimen of clay was prepared as in Example 10 and then to it was added 3% of groundnut husk suitably broken down, together with 2% cement and 0.75% aluminium sulphate. It was then compressed into a cylinder as in Example 1 designed to have 10% voids or 15.4 ccs. of air. It was then placed in water to a depth of ½" and in 72 hours had absorbed 1 gram of water.

*Example 12.—"Control" (unstabilised)*

A cylinder designed to have 10% of voids was made with 264 gms. of soil and 31 gms. of water. After standing for one day the cylinder was placed in water to a depth of 1 cm. This specimen collapsed in two hours.

*Example 13*

250 gms. of like dry soil were mixed with 38 gms. of water, and to this was added 14 gms. of groundnut husks which had been ground to pass 50 mesh. The whole was compacted into a cylinder 3" long and 2" diameter, this cylinder having a calculated voidage of 10%.

After standing for one day the cylinder was placed in water to a depth of 1 cm.; after 48 hours it had absorbed 2.5 gms. of water.

We claim:

1. A method of stabilizing soil to obtain its maximum mechanical strength which comprises reducing the soil to a particle size sufficient to pass through a 100 mesh screen, adjusting the moisture content of the soil to a value approximating that at which the soil has the approximate maximum resistance to compression, admixing with said soil 3–5% of non-starchy dried vegetable husks which will pass through a 50 mesh screen and containing as essential ingredients thereof pectates and proteins with which has been admixed a finely ground material containing about 0.75% by weight, based on the soil, of a tri-valent metal sulfate, capable of forming insoluble complexes with said pectates and proteins contained in said husks, and compacting said admixed materials to a voidage of about 10%.

2. A method of soil stabilization according to claim 1 wherein the added finely ground particles of husk are groundnut husk.

3. A method of soil stabilization according to claim 1 wherein said tri-valent metal sulfate is one selected from the group consisting of aluminum sulfate and ferric sulfate.

4. A method of soil stabilization according to claim 1 including the further step of adding bitumen in an amount sufficient to bind the particles of soil together.

5. A method of soil stabilization according to claim 1 including the addition of a minor proportion of a surface active germicide.

6. A method of soil stabilization according to claim 1 including the addition of a minor proportion of sodium pentachlorophenate.

7. A method of soil stabilization according to claim 1 wherein the added finely ground particles of husk are composed of sisal.

CONRAD LAWRENCE WALSH.
WILLIAM BERNARD HAWES.
FRANK FOULGER.

References Cited in the file of this patent

UNITED STATES PATENTS

| Number | Name | Date |
|---|---|---|
| 57,708 | Halsted | Sept. 4, 1866 |
| 737,023 | Rockwell | Aug. 25, 1903 |
| 2,238,776 | Kleinicke | Apr. 15, 1941 |

FOREIGN PATENTS

| Number | Country | Date |
|---|---|---|
| 7,201 | Great Britain | of 1836 |